Figure 1:
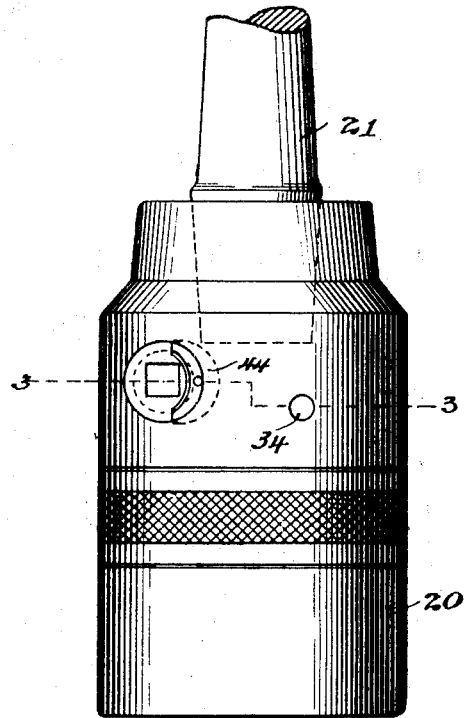

No. 893,960.  
PATENTED JULY 21, 1908.

I. A. WEAVER.  
CHUCK.  
APPLICATION FILED MAR. 31, 1906.

2 SHEETS—SHEET 1.

Witnesses,  
Inventor,  
Ira A. Weaver  
By Offield Towle & Linthicum  
Attys.

No. 893,960. PATENTED JULY 21, 1908.
I. A. WEAVER.
CHUCK.
APPLICATION FILED MAR. 31, 1906.
2 SHEETS—SHEET 2.
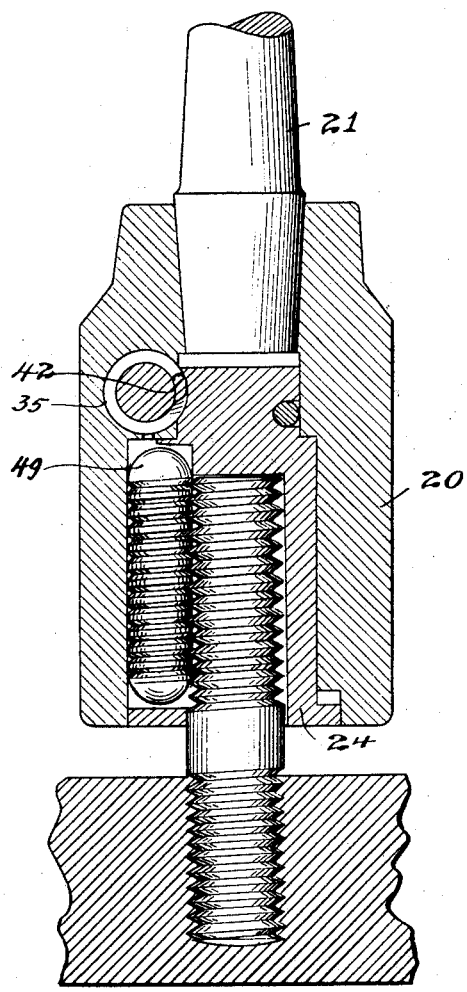
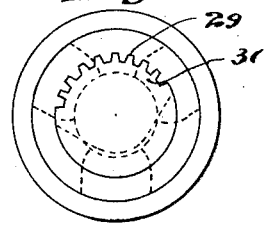
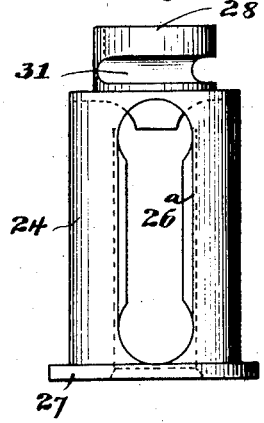
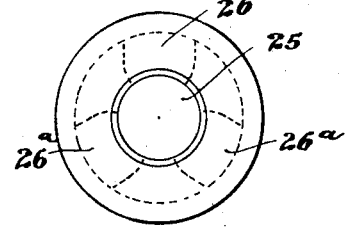
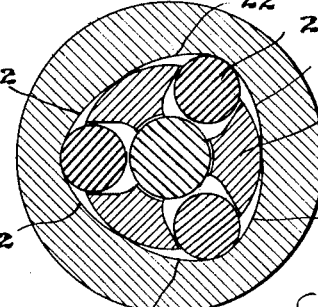
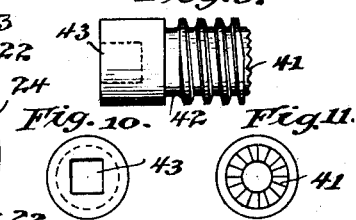

UNITED STATES PATENT OFFICE.

IRA A. WEAVER, OF SPRINGFIELD, ILLINOIS.

CHUCK.

No. 893,960.     Specification of Letters Patent.     Patented July 21, 1908.

Application filed March 31, 1906. Serial No. 309,224.

*To all whom it may concern:*

Be it known that I, IRA A. WEAVER, a citizen of the United States, residing at Springfield, in the county of Sangamon and State of Illinois, have invented certain new and useful Improvements in Chucks, of which the following is a specification.

The purpose of my present invention is to improve chucks and especially those of the type employing gripping rollers to grasp the shank of a tool or other article.

The aim of this invention is the production of a chuck which shall be simple in construction and which shall grip the tool or bolt to be held more securely than has heretofore been possible.

A chuck embodying the preferred embodiment of my invention comprises a main body or holder having internal cam surfaces, a rotatable cage holding tool gripping rollers within said body, the rollers coöperating with said cams, a key operated worm meshing with teeth on said cage whereby the key may turn the cage and rollers to cause the latter to grip or release a tool, a transverse pin or screw performing the double function of retaining the cage in the body and forming a stop determining the extent of its rotation in both directions, and neat and unique means for housing the worm in the casing and preventing its unintentional withdrawal but nevertheless permitting its ready removal when occasion demands, and a spring actuated friction disk to prevent movement of the worm and the release of the rollers unless the worm is forcibly and purposely turned by its key, together with a spring to constantly keep said rollers tightly on the tool even though they sink into it.

Figure 2:
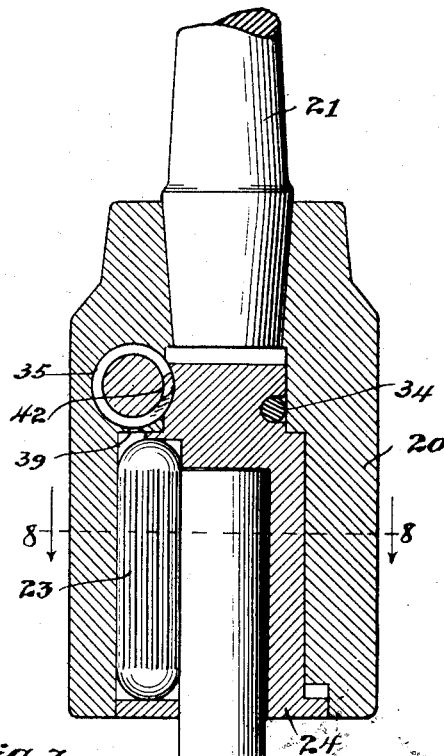
Figure 3:
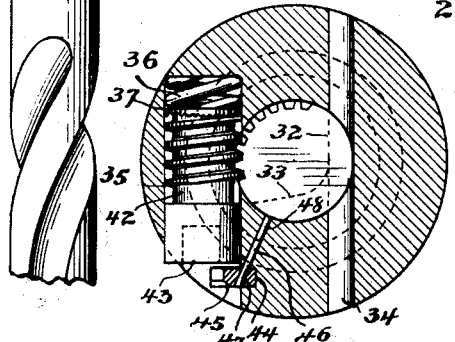
Figure 4:
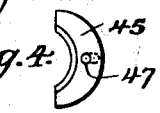

I have illustrated two embodiments of my invention in the accompanying drawings, like reference characters referring to the same parts throughout:

Figure 1 is an elevation of my novel chuck;
Fig. 2 is a central longitudinal section of the chuck shown in Fig. 1; Fig. 3 is a transverse section on the line 3—3 of Fig. 1 some of the parts remaining unsectioned; Fig. 4 is a view of the crescent-shaped key for retaining the worm in position in the body or holder; Fig. 5 is a top end view of the roller retaining cage showing the worm wheel teeth; Fig. 6 is a side elevation of the cage; Fig. 7 is a bottom end view of the same; Fig. 8 is a transverse section through the body, cage, rollers, and drill on the line 8—8 of Fig. 2 showing the rollers in expanded or tool releasing position; Fig. 9 is a side view of the worm which actuates the roller retaining cage; Fig. 10 is an end view of the same showing the square socket adapted to receive the key; Fig. 11 is a view of the opposite end of the worm illustrating the teeth which co-act with the friction means to prevent unintentional turning of the worm; Fig. 12 is a face view of the toothed washer co-acting with the inner end of the worm; Fig. 13 is an edge view of the washer shown in Fig. 12; and Fig. 14 is a view similar to Fig. 2 showing a modified type of rollers adapted for coöperation with the threads of a stay-bolt or similarly threaded rod.

Referring to the drawing the hollow body or holder 20 is adapted to fit on the tapered end of the shank 21 and turn therewith. On its inner surface body 20 is provided with the double cam surfaces 22 (Fig. 8) each pair of which is adapted to coöperate with a roller 23, of which three are shown in the present instance, and which are retained in place and spaced apart by a cylindrical skeleton body or cage 24. This cage is axially apertured at 25 to receive the shank of a tool 26 or any portion of a device to be held by the chuck.
This cage is also provided with three longitudinal slots 26ᵃ which extend from its outer surface to its hollow interior, the slots being somewhat narrower where they communicate with the cylindrical aperture 25 (Fig. 7) than at their outer ends, the width of the slots being such that these narrow portions prevent the rollers from falling inwardly into the aperture 25. At its lower end cage 24 has a cylindrical flange 27 adapted to neatly fit in and close the mouth of chuck body 20, as is shown in Fig. 2. At its upper end cage 24 is somewhat reduced in diameter and is provided with worm teeth 29 adapted to mesh with an actuating worm described below. Just below the worm wheel 30 having the teeth 29 the cage is milled so as to provide a slot 31 having two portions at substantially right angles to each other, as is clearly illustrated in Fig. 3, providing the two stop surfaces 32 and 33. After the rollers 23 have been inserted in the slots 26 the cage is introduced into the hollow interior of the body 20 and is retained in place by means of a transverse pin 34 which fits in the slot 31 and passes through a hole traversing the chuck body. It is obvious from this construction that the cage and its rollers may be readily removed from the body or holder by forcing the pin 34 through the chuck body thereby permitting the withdrawal of the cage and rollers. Since a nail, wire, or similar article may be used for pushing this pin through it is apparent that no tools are necessary for removing the cage.

At one side of the center of the holder or body 20 is drilled a transverse hole 35 which does not extend quite through the body. At the inner end portion of this hole or recess I provide a short spiral spring 36 which at its inner end abuts against the end wall of the hole and at its outer end presses against the smooth surface of a toothed disk 37, which has a projection or tongue 38 adapted to fit in a slot 39 (Fig. 2) to prevent the disk from rotating, at the same time allowing it a limited longitudinal movement. On its outer surface disk 37 has the V-shaped teeth 40 which co-act with similar teeth 41 on the inner end of a worm 42 which is intended to be placed in the hole 35 and mesh with the teeth 29 of the worm wheel 30. At its outer end worm 42 has a square aperture 43 adapted to receive the end or shank of a key for turning the worm, the worm wheel, cage, and rollers.

At the mouth of the cylindrical hole 35 and extending laterally thereto is a crescent-shaped recess 44 (Figs. 1 and 3) which may receive a similarly shaped key 45, (Fig. 4) the latter projecting sufficiently into the path of the worm 42 to prevent it from being removed from the aperture 35 unintentionally. In order to retain this key 45 in position I provide a pin 46 which passes through a hole 47 in the key and a similar hole 48 in the body 20 which communicates with the interior thereof. When it is desired to remove the key and worm, pin 46 may be readily driven into the hollow interior of the chuck body, the cage having been first removed, so that the key is free to be slipped out of its keyway thereby permitting the removal of the worm and the disk and spring if required. The function of the spring and disk is to firmly hold the worm in position and prevent it from backing off when the tool in the chuck is doing its work.

In Figs. 2 and 8 I have illustrated the rollers 23 as having longitudinally fluted surfaces but sometimes it becomes desirable to employ a chuck of this character for screwing stay-bolts into or removing the same from boilers or other appliances. Since in a case of this kind it becomes necessary for the chuck rollers to grip the threaded portion of the bolt, it is advisable to employ special rollers for this purpose, so as not to crush or otherwise injure the threads, and to meet this need I have invented the rollers 49, shown in Fig. 14, each of which has a spirally grooved surface, as illustrated. The threads of the bolt are adapted to fit in these grooves thereby permitting the rollers to obtain a firm hold on the bolt without harming or damaging the thread. In case the chuck is to be used with bolts having threads of different pitches it is obvious that rollers with grooves of corresponding pitches must be employed and such rollers are contemplated by my invention. In order that the threads of the bolt may readily find their seat in the spiral grooves of the rollers, the latter are made somewhat shorter than the cage recesses within which they are housed so as to give them a limited longitudinal play whereby they may more readily grip the threads of the bolt and become properly seated.

The operation of the chuck is as follows:—Assuming that the rollers are expanded, that is in their outermost position, as shown in Fig. 8, a tool is inserted in the mouth of the chuck and the rollers are brought up thereto so as to grasp the same by the means previously described. A key of the usual type with a squared end is fitted in the recess 43 and the worm is turned, thereby, at the same time, rotating the worm wheel 30 and the roller cage which forms a part thereof. When the worm is turned the teeth 41 on its end ride over the teeth 40 on disk 37 which is forced back as the teeth pass by against the pressure of spring 36 and as soon as the cage is brought into such position that the rollers firmly grip the tool the teeth will again become interlocked so as to prevent the worm from backing off or loosening the rollers except by means of the key. Further turning of the worm after the rollers have once grasped the tool causes the worm to move bodily away from the key 45 to a slight extent in opposition to the pressure of spring 36. If, in a construction of this character, the rollers sink more or less into the shank of the tool during the drilling operation spring 36 will slide worm 42 outwardly sufficiently to turn worm wheel 30 enough to constantly keep the rollers tightly gripping the tool. As the cage turns in either direction, because of the pairs of oppositely inclined cam surfaces 22, the rollers are forced inwardly so as to clamp the shank of the tool. Shoulders 32 and 33 at the upper end of the cage when they strike against pin 34 act as stops to limit the rotation of the cage in either direction. In order to remove the tool the worm 42 is merely turned in the opposite direction so as to allow the rollers to travel down the cam surfaces and expand.

Minor mechanical changes may be made in a chuck of this type without departing from the substance of my invention, such changes falling within the scope of the following claims.

Cross reference is made to my co-pending applications Serial Nos. 212,741 and 300,699 which show and claim some of the features illustrated and described in this application but not claimed herein.

I claim:

1. In a chuck, the combination of members adapted to grip and release a tool or similar article, a chuck body having means to force said members into tool gripping position or permit them to release a tool, a cage for said members, a worm wheel movable with said cage, a slidable rotary worm to actuate said worm wheel, and a spring acting on said worm to prevent its unintentional turning and to slide the same to turn said cage to compensate for the sinking of said members into the shank of the tool, substantially as described.

2. In a chuck, the combination of members adapted to grip and release a tool or similar article, a chuck body having means to force said members into tool gripping position or permit them to release a tool, a cage for said members, a worm wheel movable with said cage, a worm rotatable in a recess in said chuck body to actuate said worm wheel, and a spring at the inner end of said recess acting on said worm to prevent its unintentional turning, substantially as described.

3. In a chuck, the combination of rollers adapted to grip and release a tool or similar article, a chuck body having cam tracks with which said rollers coöperate to force said rollers into tool gripping position or permit them to release a tool, a cage for spacing said rollers apart, a worm wheel movable with said cage, a slidable rotary worm to actuate said worm wheel mounted in a recess in said chuck body, and a spring at the inner end of said recess acting on said worm to prevent its unintentional turning and to slide the same to turn the cage to compensate for the sinking of said rollers into the shank of the tool, substantially as described.

4. In a chuck, the combination of members adapted to grip and release a tool or similar article, a chuck body having means to force said members into tool gripping position or permit them to release a tool, a cage for said member, a worm wheel movable with said cage, a worm to actuate said worm wheel mounted in a recess of said chuck body, and a disk and spring at the inner end of said recess, said spring forcing said disk against said worm to prevent its unintentional turning, substantially as described.

5. In a chuck, the combination of a body having cam surfaces, a rotatable cage, rollers in said cage co-acting with said cam surfaces, a worm wheel movable with said cage, a worm meshing with said worm wheel, said worm being provided with teeth, a washer having corresponding teeth co-acting with said worm teeth, and a spring pressing upon said washer forcing said sets of teeth together, substantially as described.

6. In a chuck, the combination of a body having a cylindrical hole therein, a member adapted to fit in said hole, said body having a crescent-shaped recess transverse to and at the mouth of said hole, and a substantially crescent-shaped key adapted to fit in said recess and partially overlap the mouth of said hole to prevent said member from being removed, substantially as described.

7. In a chuck, the combination of a hollow body having a cylindrical hole therein, a worm adapted to fit in said hole, said body having a crescent-shaped recess transverse to and at the mouth of said hole, a substantially crescent-shaped retaining key adapted to fit in said recess and overlap the mouth of said hole to prevent said worm from being removed, said key and body having registering holes communicating with the hollow interior of said body, and a pin adapted to fit in said holes to retain said key in position, said pin being also adapted to be driven through said holes into the interior of said body thereby permitting the removal of said key, substantially as described.

8. In a chuck, the combination of a chuck body having a cylindrical recess, a cage having a transverse aperture with two walls at an angle to each other adapted to be rotatably mounted in said recess, and a pin adapted to fit in a hole extending through said body and in said aperture, thereby retaining said cage in said body and by co-acting with said two walls forming stops for the rotation of said cage, substantially as described.

9. In a chuck, the combination of one or more gripping rollers each with one or more grooves adapted to engage the thread of a bolt or similar screw-threaded member, and means to cause said rollers to grip and release the member adapted to be held thereby, substantially as described.

10. In a chuck, the combination of a hollow chuck body and a concentric relatively rotatable member, one of said parts having internal cam surfaces and the other having recesses, rollers shorter than said recesses adapted to fit and have a slight longitudinal movement therein, each of said rollers having a spiral groove adapted to engage the thread of a bolt or similar screw-threaded member, and means to actuate said rotatable part whereby said rollers are caused to travel on said cam surfaces and grip or release said bolt, substantially as described.

11. In a chuck, the combination of a body having cam surfaces, tool gripping rollers adapted to travel on said cam surfaces and grasp or release the shank of an inserted tool, a cage for said rollers, a worm and worm wheel to actuate said cage, and a spring acting on said worm to slide the same longitudinally thereby turning said cage and compensating for any looseness caused by said rollers sinking into the shaft of the tool, substantially as described.

Signed by me this 27 day of March at Springfield, Illinois, in the presence of two witnesses.

IRA A. WEAVER.

Witnesses:
C. E. GILTNER,
M. A. McCUTCHEN.